(12) United States Patent
Redmond et al.

(10) Patent No.: US 11,421,674 B2
(45) Date of Patent: Aug. 23, 2022

(54) OPTICAL MONITORING AND CONTROL OF PUMPJACK

(71) Applicant: Schneider Electric Systems USA, Inc., Foxborough, MA (US)

(72) Inventors: James Redmond, Richmond (CA); Zackery Sobin, Raleigh, NC (US); Scott Guimond, Gatineau (CA)

(73) Assignee: Schneider Electric Systems USA, Inc., Foxborough, MA (US)

(*) Notice: Subject to any disclaimer, the term of this patent is extended or adjusted under 35 U.S.C. 154(b) by 50 days.

(21) Appl. No.: 17/127,241

(22) Filed: Dec. 18, 2020

(65) Prior Publication Data

US 2022/0195864 A1 Jun. 23, 2022

(51) Int. Cl.
| | |
|---|---|
| *F04B 47/02* | (2006.01) |
| *E21B 47/009* | (2012.01) |
| *F04B 49/06* | (2006.01) |
| *F04B 51/00* | (2006.01) |
| *E21B 43/12* | (2006.01) |

(Continued)

(52) U.S. Cl.
CPC ......... *F04B 47/022* (2013.01); *E21B 43/127* (2013.01); *E21B 47/009* (2020.05); *F04B 49/065* (2013.01); *F04B 51/00* (2013.01); *F04B 2201/00* (2013.01); *F04B 2201/121* (2013.01); *G05D 7/0676* (2013.01); *G06K 9/62* (2013.01)

(58) Field of Classification Search
CPC ........ F04B 47/02; F04B 49/065; F04B 51/00; F04B 2201/00; F04B 2201/121; E21B 43/127; E21B 47/009; G05D 7/0676; G06K 9/62

See application file for complete search history.

(56) References Cited

U.S. PATENT DOCUMENTS

| | | | |
|---|---|---|---|
| 5,588,963 A | * 12/1996 | Roelofs | G01F 3/00 604/65 |
| 10,970,590 B2 | * 4/2021 | Luharuka | G06K 9/6269 |

(Continued)

FOREIGN PATENT DOCUMENTS

| | | |
|---|---|---|
| CA | 2526345 A1 | 4/2007 |
| CN | 113037422 A * | 6/2021 |
| WO | 2013009715 A1 | 1/2013 |

OTHER PUBLICATIONS

European EP Extended Search Report for EP Application No. 21212005.9 dated May 11, 2022.

*Primary Examiner* — Charles G Freay
(74) *Attorney, Agent, or Firm* — Locke Lord LLP

(57) ABSTRACT

Systems and methods provide real-time optical monitoring and control of well operations using digital cameras and image analysis. The systems and methods deploy one or more digital cameras in place of or in addition to conventional sensors to capture images of a well pump during well operations. The images may then be analyzed using image analysis algorithms and programs to measure a height, position, shape, and other measurements for certain components of the well pump relative to previous images. These image-based measurements may then be used to determine various operational parameters, such as pump speed, pump load, and other operational parameters. The operational parameters may then be processed by a pump control system to optimize pump operations based on the operational parameters.

20 Claims, 6 Drawing Sheets

(51) Int. Cl.
    *G05D 7/06* (2006.01)
    *G06K 9/62* (2022.01)

(56) References Cited

U.S. PATENT DOCUMENTS

2004/0223533 A1* 11/2004 Dishaw ................. E21B 19/166
                                                        374/45
2017/0306745 A1* 10/2017 Harding ................ F04B 47/028
2019/0203578 A1    7/2019 Hecht et al.

* cited by examiner

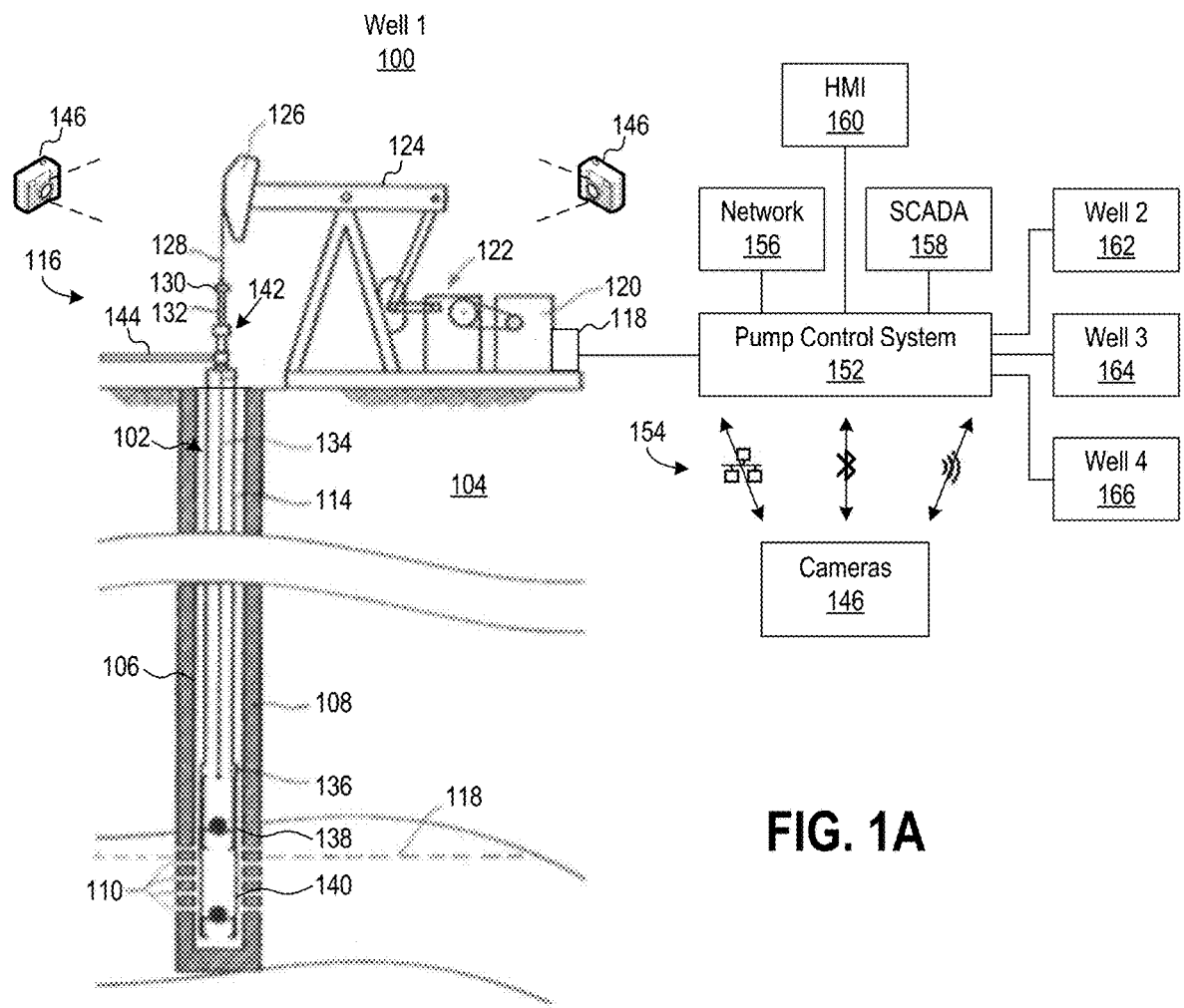
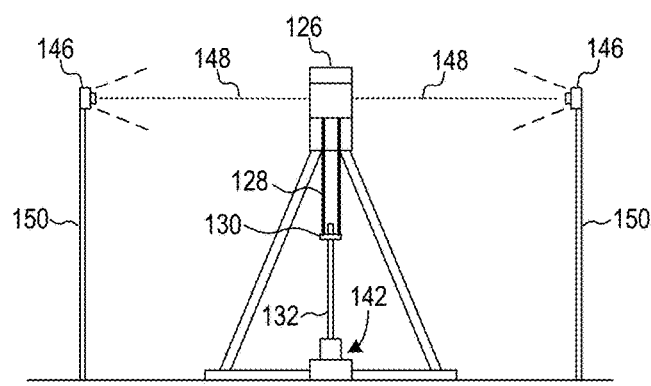
FIG. 1A
FIG. 1B

OPTICAL MONITORING AND CONTROL OF PUMPJACK

TECHNICAL FIELD

The present disclosure relates to methods and system for monitoring oil and gas wells to ensure proper operation of the wells, and more particularly to methods and systems for providing real-time optical monitoring and control of well operations using digital cameras and image analysis.

BACKGROUND

Oil and gas wells operate to extract hydrocarbons from a subterranean formation. A typical well site includes a wellbore that has been drilled into the formation and sections of pipe or casing cemented in place within the wellbore to stabilize and protect the wellbore. The casing is perforated at a certain target depth in the wellbore to allow oil, gas, and other wellbore fluids to flow from the formation into the casing. Tubing is run down the casing to provide a conduit for the wellbore fluids to flow up to the surface where they are collected. The wellbore fluids can flow up the tubing naturally if there is sufficient pressure in the formation, or well pump equipment can be used to provide an artificial lift for the wellbore fluids.

To operate an artificial lift system in a cost-effective manner, the well pump should have a pump fillage level and speed that result in a profitable amount of wellbore fluid being extracted by the pump while avoiding pumped-off conditions. A pumped-off condition occurs when the rate at which wellbore fluids are being pumped to the surface exceeds the rate at which the subterranean formation is supplying wellbore fluids to the pump. A well pump operating in a pumped-off condition is no longer pumping effectively and efficiently, which can damage the pump and associated downhole equipment. Such damage usually results in down time for the well, lost production, and expensive repairs to the damaged components. It is therefore important to monitor and control well operations to avoid a pumped-off condition and other abnormal operating conditions.

Traditional pump control systems evaluate production and performance of wells by using physical sensors to monitor the pump's position and load. While the use of position and load sensors can be effective, the physical sensors are known to fail due to a number of factors, including mechanical wear, corrosion, water egress, and cable damage. Also, load cell and position sensor installation requires specialized equipment and investment of significant time and labor. Wireless sensors may be used as an alternative in some cases, but wireless sensors have restricted battery life and are susceptible to signal interference or physical obstructions.

Thus, while a number of advances have been made in the field of oil and gas production, it will be readily appreciated that improvements are continually needed.

SUMMARY

The present disclosure relates to systems and methods for providing real-time optical monitoring and control of well operations using digital cameras and image analysis. The systems and methods deploy one or more digital cameras in place of or in addition to conventional sensors to capture images of a well pump during well operations. The images may then be analyzed using image analysis algorithms and programs to measure a height, position, shape, and other measurements for certain components of the well pump relative to previous images. These image-based measurements may then be used to determine various operational parameters, such as pump speed, pump load, and other parameters. The operational parameters may then be processed by a pump control system to optimize pump operations based on the operational parameters.

The systems and methods disclosed herein are particularly useful for monitoring and control of pumpjacks and similar types of well pumps. In these embodiments, one or more digital cameras may be positioned proximate to a pumpjack such that the camera viewing angle is substantially perpendicular to the pumpjack. The cameras may then capture images of the pumpjack at a certain frequency and publish or transmit those images to the pump control system. The pump control system analyzes the images from the cameras using image analysis algorithms and programs to ascertain certain operational parameters related to the pumpjack. The operational parameters may include pumpjack speed, fluid column height, pump fillage level, pumpjack walking beam balance and deflection, among other parameters. From these operational parameters, the systems and methods may determine whether the pumpjack is experiencing fluid pound, excessive load, belt slippage, and the like.

In some embodiments, the pump control system may receive and analyze camera images from multiple wells, each well having one or more cameras positioned proximate a respective pumpjack. The pump control system can then periodically rotate through the cameras for each well and perform an analysis of the images for a respective pumpjack. The analysis may determine whether any corrections need to be made to the operation of the pumpjack based on the camera images. If so, the pump control system can automatically control a prime mover in real time to implement the corrections. Additionally (or alternatively), the pump control system can send an alert to an operator via a text or e-mail message to notify the operator of the need to make a correction. The pump control system may then proceed to the next well in the rotation and evaluate the camera images from that well, and so on.

The above camera-based embodiments provide several benefits, including reduction or elimination of physical or mechanical sensor interactions with the pump assemblies. In addition, no operational downtime or specialized technicians are required to mount and install the cameras around the pump assemblies. Other benefits include reduced maintenance and repair cost and time for the cameras compared to conventional sensor-based pump control systems. Still other benefits will be readily apparent to those skilled in the art.

In general, in one aspect, the present disclosure relates to system for monitoring and controlling a pump assembly at a well. The system comprises, among other things, a processor and a storage device coupled to communicate with the processor. The storage device storing computer-readable instructions thereon that, when executed by the processor, cause the system to receive camera images of the pump assembly, the camera images captured by at least one digital camera at the well, and measure a change in a component of the pump assembly, the component appearing in the camera images. The computer-readable instructions also cause the system to compute at least one operational parameter for the pump assembly based on the change in the component of the pump assembly, and determine whether the at least one operational parameter indicates the pump assembly is operating abnormally. The computer-readable instructions further cause the system automatically initiate a corrective action in response to a determination that the pump assembly is operating abnormally.

In general, in one aspect, the present disclosure relates to a method of monitoring and controlling a pump assembly at a well. The method comprises, among other things, receiving camera images of the pump assembly, the camera images captured by at least one digital camera at the well, and measuring a change in a component of the pump assembly, the component appearing in the camera images. The method further comprises computing at least one operational parameter for the pump assembly based on the change in the component of the pump assembly, and determining whether the at least one operational parameter indicates the pump assembly is operating abnormally. A corrective action is automatically initiated in response to a determination that the pump assembly is operating abnormally.

In general, in one aspect, the present disclosure relates to a system for monitoring and controlling a pump assembly at a well. The system comprises, among other things, a pump control system at the well, the pump control system operable to control operation of the pump assembly. The system further comprises at least one digital camera at the well, the at least one digital camera configured to capture images of the pump assembly and transmit the images to the pump control system. The pump control system is also operable to receive the images of the pump assembly captured by the at least one digital camera at the well, and measure a change in a component of the pump assembly, the component appearing in the images. The pump control system is further operable to compute at least one operational parameter for the pump assembly based on the change in the component of the pump assembly, and determine whether the at least one operational parameter indicates the pump assembly is operating abnormally. The system automatically initiates a corrective action in response to a determination that the pump assembly is operating abnormally.

In accordance with any one or more of the foregoing embodiments, measuring a change in the component is performed by measuring a change in a position of the component in the camera images. In accordance with any one or more of the foregoing embodiments, measuring a change in the position of the component is performed by measuring a distance between a first predefined position for the component and a second predefined position for the component in the camera images. In accordance with any one or more of the foregoing embodiments, measuring a change in the position of the component is performed by measuring an elapsed time corresponding to the change in the position of the component in the camera images.

In accordance with any one or more of the foregoing embodiments, measuring a change in the component is performed by measuring a change in a shape of the component in the camera images.

In accordance with any one or more of the foregoing embodiments, the camera images have a viewing angle that is substantially perpendicular to the component of the pump assembly. In accordance with any one or more of the foregoing embodiments, the pump assembly is a pumpjack and the component is one of: a walking beam, a donkey head, the bridal, a polished rod, and a crank arm.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIGS. 1A-1B are schematic diagrams illustrating a well site that uses an image-based pump control system according to embodiments of the present disclosure;

Identical reference numerals have been used, where possible, to designate identical elements that are common to the figures. However, elements disclosed in one embodiment may be beneficially utilized on other embodiments without specific recitation.

DETAILED DESCRIPTION

Figure 2:
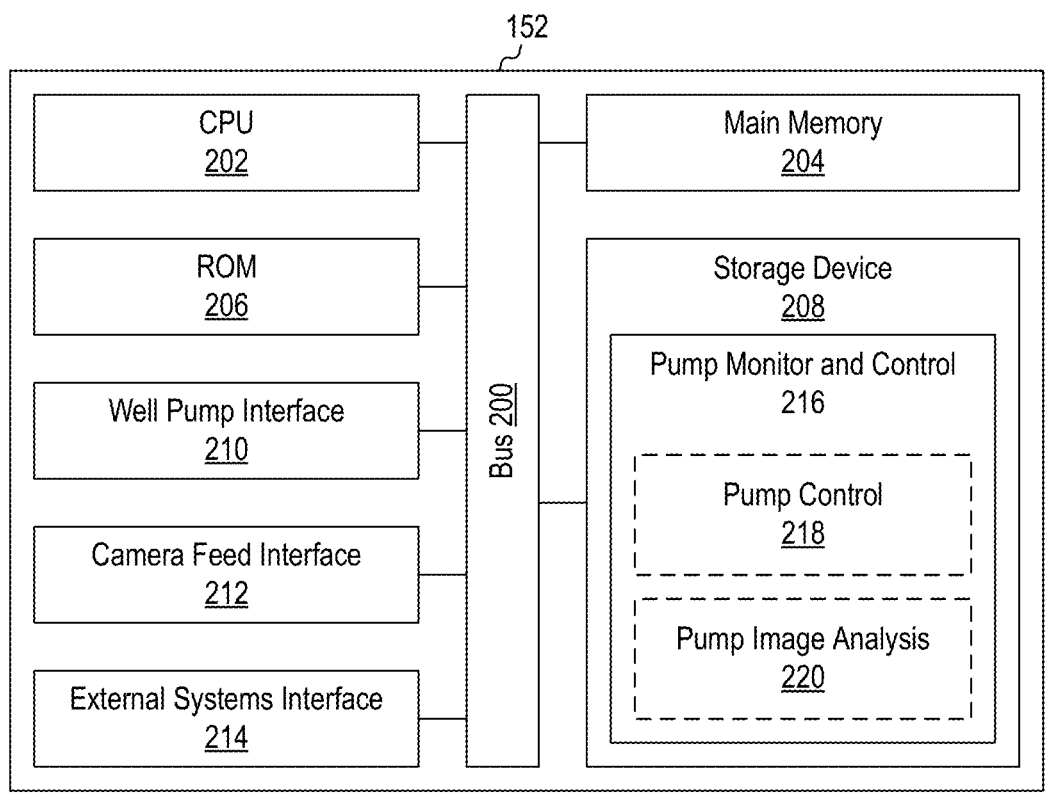
FIG. 2 is a block diagram illustrating an exemplary image-based pump control system according to embodiments of the present disclosure.

The following discussion is presented to enable a person ordinarily skilled in the art to synthesize and use the exemplary disclosed embodiments. Various modifications will be readily apparent to those skilled in the art, and the general principles described herein may be applied to embodiments and applications other than those detailed below without departing from the spirit and scope of the disclosed embodiments as defined herein. Accordingly, the disclosed embodiments are not intended to be limited to the particular embodiments shown, but are to be accorded the widest scope consistent with the principles and features disclosed herein.

Referring now to FIG. 1A, a schematic diagram of an exemplary well 100 is shown according to embodiments of the present disclosure. At this well 100, a wellbore 102 has been drilled into a subterranean formation 104 and lined with a casing 106 and cement 108 to stabilize and protect the wellbore 102. Perforations 110 are formed in the casing 106 and cement 108 at a certain target depth 112 where oil, gas, and other wellbore fluids are expected to be found. Tubing 114 is extended into the wellbore 102 for extraction of wellbore fluids entering through the perforations 110. The formation 104 in this example no longer has sufficient formation pressure to produce wellbore fluids naturally and therefore a rod pump assembly 116 is installed at the well site 100 to provide artificial lift for the wellbore fluids. The rod pump assembly 116, also called a donkey head pumpjack, includes a variable speed drive (VSD) 118, variable speed motor 120, crank arm 122, walking beam 124, donkey head 126, bridle cables 128 and bridle 130, polished rod 132, and sucker rod 134, connected as shown.

Operation of the rod pump assembly 116 is well known to those skilled in the art and is thus mentioned only briefly here. In general, the VSD 118 drives the variable speed motor 120 to rotate the crank arm 122, causing the walking beam 124 to seesaw, which moves the donkey head 126, and hence the bridle cables 128 and bridle 130, polished rod 132, and sucker rod 134, up and down, thereby converting the rotating motion of the variable speed motor 120 into a linear motion at the sucker rod 134. A plunger 136 is attached to the end of the sucker rod 134 for lifting the wellbore fluids. The plunger 136 has a traveling valve 138 at a bottom thereof that opens on the downward stroke of the sucker rod 134 to let wellbore fluids into the plunger 136 and hence into the tubing 120. The traveling valve 138 closes on the upward stroke of the sucker rod 134, thereby lifting the wellbore fluids up the tubing 114. Conversely, a pump barrel 140 at the bottom of the tubing 114 has a standing valve (not specifically labeled) that closes on the downward stroke of the sucker rod 134 and opens on the upward stroke to let in wellbore fluids from the wellbore 110. At the surface, a wellhead 142, also called a Christmas tree, diverts the wellbore fluids into one or more discharge lines 144 that carry the fluids to one or more holding tanks (not expressly shown) for storage and processing.

In accordance with embodiments of the present disclosure, one or more cameras 146 may be positioned proximate the pump assembly 116. Preferably, the one or more cameras 146 are positioned such that each camera's viewing angle is substantially perpendicular (e.g., within ±20%) to at least one component of the pump assembly 116, as indicated by the dashed lines 148 in FIG. 1B. The at least one component may be, for example, the crank arm 122, walking beam 124, donkey head 126, bridle 128 or other components that have a visually observable motion during operation of the pump assembly 116. Each of the one or more cameras 146 may be mounted on a stand 150 positioned on either side of the pump assembly 116, or on both sides, as depicted in FIG. 1B.

The substantially perpendicular viewing angle mentioned above makes it easier to visually detect movement or changes in the position of the pump assembly components during operation of the pump assembly 116. It should be noted, however, that a substantially perpendicular viewing angle is not required. In general, any viewing angle may be used provided the specific viewing angle used can be accounted for in the analysis of the camera images.

Placement of the cameras 146 relative to the pump assembly 116 depends on the resolution of the cameras, the size of the pump assembly, as well as the pumping speed and measurement resolution required (QoS), among other factors. As an example, assuming a 72 megapixel camera, the pump assembly would be projected onto a 8485×8485 pixel image. Assume also that the pump assembly is relatively large, approximately 34 feet long×58 feet tall, and has a stroke length of about 330 inches. The camera image would then capture 58 feet per 8485 pixels, or about 0.08 inches per pixel for a given column of pixels. This provides a measurement resolution of about 0.1 inches per pixel from the camera images. Assume further that the camera takes 100 images per second at 72 megapixels, and that the pump assembly runs at 5 strokes per minute (SPM). With a 330-inch stroke length, certain components of the pump assembly (e.g., polished rod, bridle, etc.) would travel about 55 inches per second, or 0.55 inches per image.

Preferably, the one or more cameras 146 are digital cameras that are programmable or controllable to capture images of the pump assembly 116, or at least certain components thereof, at a predefined frequency (e.g., 100 images per second). Examples of suitable cameras include industrial digital cameras available from Basler AG of Ahrensburg, Germany, among other vendors. These industrial digital cameras are generally made to withstand exposure to outdoor environmental conditions and can generally provide higher resolution images compared to consumer grade digital cameras, though the latter may also be used under certain circumstances.

Regardless of camera type, the cameras 146 should be capable of either automatically taking pictures on a regular basis, and/or taking a series of pictures in response to receiving a control signal from a pump control system 152. The control signal may be received by the one or more cameras 146 over any suitable wired or wireless communication link 154, such as real-time Ethernet, Bluetooth, Wi-Fi, ZigBee, and the like. The cameras 146 should also be capable of transmitting the images to the pump control system 152 over the wired or wireless communication link 154.

At the pump control system 152, the camera images are analyzed to determine whether the pump assembly 116 is operating properly or if there are indications of abnormal operation. The image analysis may be performed using any suitable image analysis algorithms known to those skilled in the art, including machine learning (ML) based algorithms. These image analysis algorithms are configured and/or trained to measure, for example, the heights, shapes, relative positions, and other aspects with respect to certain components of the pump assembly 116. The pump control system 152 then uses the measurements derived from the image analysis to determine one or more operational parameters for the pump assembly 116. As mentioned earlier, the operational parameters may include pump speed, pump fillage level, walking beam balance and deflection, among other parameters. From these operational parameters, the pump control system 152 determines whether the pumpjack may be experiencing fluid pound, excessive load, belt slippage, and the like. The pump control system 152 then automatically takes a preprogrammed action based on the abnormal operation detected to address any abnormal operation that may be detected. For example, the pump control system 152 may slow down the VSD 118 based on the abnormal operation detected.

In some embodiments, the pump control system 152 can also send the measurements and analyses thereof (or data therefor) to a network 156 for storage and monitoring and tracking purposes. Additionally, the pump control system 152 can transmit the measurements and analyses (or data therefor) to an external control system, such as a supervisory control and data acquisition (SCADA) system 158. From there, the data may be forwarded to other systems within an enterprise and/or to the Cloud (which may include a private enterprise Cloud) for further processing as needed. Further, the pump control system 152 can display certain selected measurements and analyses on a display, such as a human-machine-interface (HMI) 160, for review by a user. The user can then navigate the HMI 162 to manually control certain operations of the pump assembly 116 as needed via the pump control system 152.

In some embodiments, the pump control system 152 receives and analyzes camera images from one or more additional wells, such as wells 162, 164, 166 (i.e., Well 2, Well 3, and Well 4), to determine whether these wells are operating properly. In such embodiments, the pump control system 152 can cycle through each well 100, 162, 164, 166 and perform an analysis of the camera images for the pump assemblies thereof. The analysis may determine whether any pump assemblies are experiencing abnormal operations and need to be adjusted or corrected. If adjustments/corrections are needed, the pump control system 152 can automatically control the VSD of the pump assembly in real time to make the adjustments/corrections. In addition, or alternatively, the pump control system 152 can alert an operator via a text or e-mail message to notify the operator of the need to make the adjustments/corrections.

FIG. 2 is a block diagram illustrating an exemplary pump control system 152 in accordance with embodiments of the present disclosure. In one embodiment, the pump control system 152 includes a bus 200 or other communication pathway for transferring data within the control system, and a CPU 202, which may be any suitable microprocessor or microcontroller, coupled with the bus 200 for processing the information. The pump control system 152 may also include a main memory 204, such as a random-access memory (RAM) or other dynamic storage device coupled to the bus 200 for storing computer-readable instructions to be executed by the CPU 202. The main memory 204 may also be used for storing temporary variables or other intermediate information during execution of the instructions executed by the CPU 202.

The pump control system 152 may further include a read-only memory (ROM) 206 or other static storage device coupled to the bus 200 for storing static information and instructions for the CPU 202. A computer-readable storage device 208, such as a nonvolatile memory (e.g., Flash memory) drive or magnetic disk, may be coupled to the bus 200 for storing information and instructions for the CPU 202. The CPU 202 may also be coupled via the bus 200 to a well pump interface 210 for allowing the pump control system 152 to communicate with and control the prime mover (e.g., VSD 118) at each well (e.g., Well 1, Well 2, Well 3, and Well 4) connected thereto. A camera feed interface 212 may be coupled to the bus 200 for allowing the pump control system 152 to communicate with and control the one or more digital cameras (e.g., cameras 146) installed at the wells. An external systems interface 214 may be coupled to the bus 200 for allowing the pump control system 152 to communicate with various external systems, such as a touchscreen or HMI (e.g., HMI 160), SCADA system (e.g., SCADA system 158), network (e.g., network 156), and the like.

The term "computer-readable instructions" as used above refers to any instructions that may be performed by the CPU 202 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 208. Volatile media may include dynamic memory, such as main memory 204. Transmission media may include coaxial cables, copper wire and fiber optics, including wires of the bus 200. Transmission itself may take the form of electromagnetic, acoustic or light waves, such as those generated during radio frequency (RF) and infrared (IR) data communications. Common forms of computer-readable media may include, for example, magnetic medium, optical medium, memory chip, and any other medium from which a computer can read.

A pump monitor and control application 216, or rather the computer-readable instructions therefor, may also reside on or be downloaded to the storage device 208. The pump monitor and control application 216 may then be executed by the CPU 202 and other components to monitor and control operation of the pump assemblies at each well (e.g., via VSD 118). The monitor and control application 216 can also analyze the camera images from the cameras 146 at the wells to detect abnormal operations and generate real-time corrective responses for each well. Such a pump monitor and control application 216 may be written in any suitable computer programming language known to those skilled in the art using any suitable software development environment. Examples of suitable programming languages include IEC61131-3, C, C++, C#, Python, Java, Perl, and the like.

In the FIG. 2 example, the pump monitor and control application 216 includes, or has access to, one or more pump control modules 218, each pump control module 218 corresponding to the type of well pump being used at each respective well. The pump monitor and control application 216 may also include, or have access to, one or more pump image analysis modules 220, each pump image analysis module 220 corresponding to the type of well pump being used at each respective well. The pump image analysis modules 220 analyze the camera images from each well and determine the operational parameters for the well pump at each well. Preferably, the pump image analysis modules 220 performs the analysis in real time, but a real-time analysis may not be needed, depending on the requirements of the particular application. For a pumpjack, the operational parameters may include pump speed, pump fillage, rod displacement, tension load, walking beam balance, and the like. The pump control module 218 for a given well may then issue a command in real time to the well pump at that well to automatically make any adjustments or corrections needed to address any abnormal operations detected at the well.

Figure 3:
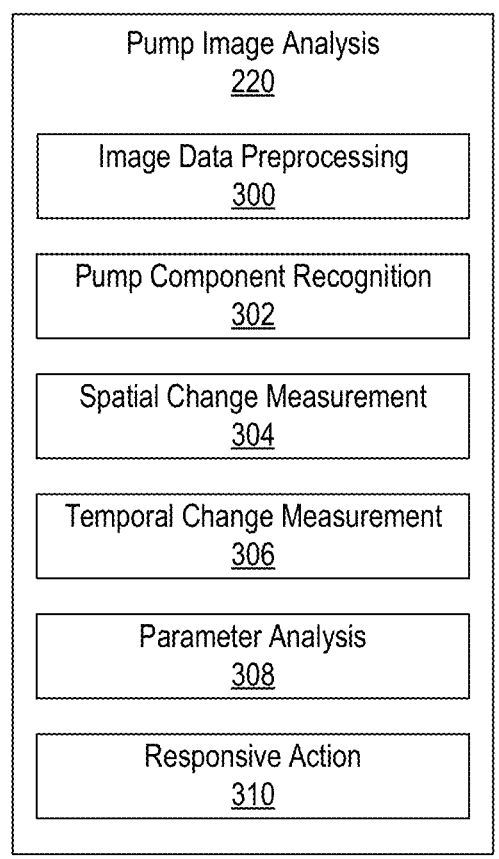
FIG. 3 is a block diagram illustrating an exemplary pump image analysis module according to embodiments of the present disclosure.

FIG. 3 is a block diagram illustrating the exemplary pump image analysis module 220 from FIG. 2 in more detail. As can be seen, the pump image analysis module 220 has several routines or functions that may be called in some embodiments. These functions include functions that provide image data preprocessing 300, pump component identification or recognition 302, spatial change measurement 304, temporal change measurement 306, parameter analysis 308, and responsive action 310. The different functions operate in conjunction with one another to allow the pump image analysis module 220 to analyze camera images from a well pump and determine one or more operational parameters for the well pump. If the pump image analysis module 220 determines that one or more of the operational parameters indicate abnormal operation, then the module 220 can identify any corrective actions or adjustments that may be needed and provide the corrective action/adjustment to the pump control module 218.

In general, the data preprocessing function 300 performs cleaning of the camera images received by the pump control system 146 before further processing of the images in the pump image analysis module 220. This cleaning may involve, in some embodiments, checking that the camera images contain valid data (i.e., not corrupted) and removing or deleting any extraneous matter that may appear in the main usable area of the images (e.g., bugs, birds, etc.).

The pump component recognition function 302 identifies or looks for certain preselected pump assembly components in the camera images. As mentioned earlier, in the example of a pumpjack, these pump assembly components may include the crank arm 122, walking beam 124, the donkey head 126, the bridle 128, or other components for which movement can be visually observed during operation of the pump assembly 116. Preferably, the pump component recognition function 302 is configured to identify a particular target component from among the different pump assembly components in the camera images, such as the walking beam 124, although identifying multiple pump assembly components is well within the scope of the present disclosure. In some embodiments, a target component can be identified using a visual model (or digital equivalent thereof) for that component that the pump component recognition function 302 can match up to objects appearing in the camera images. The visual model represents what the component looks like from the specific viewing angles of the digital cameras 146. Different visual models may be used for different components at different wells, respectively.

In some embodiments, the pump component recognition function 302 performs the component identification discussed above using one or more machine learning (ML) algorithms. As those skilled in the art understand, ML algorithms, both supervised and unsupervised algorithms, are particularly useful for processing image data and recognizing patterns therein. Any suitable ML algorithms known to those skilled in the art may be used with the pump component recognition function 302, including CNN (convolution neural network), Siamese, AE+FCN (Autoencoder+Fully-Connected Network), HOG (Histogram of Oriented Gradients), and HOG kNN (k-Nearest Neighbors), and the like. Once these ML algorithms are trained or otherwise configured with a visual model of a target component, the pump component recognition function 302 can input the camera images into the ML algorithms to identify the component.

After a pump assembly component is identified in the camera images, the spatial change measurement function 304 determines whether the component has moved in the camera images and, if so, the amount of movement. In some embodiments, this can be done by determining whether a position of the component has changed within a camera image relative to previous camera images. If the position of the component has changed, then the spatial change measurement function 304 measures the extent of the change. For example, where the camera viewing angle is perpendicular to the component, as mentioned above, the extent of the position change may be measured by measuring the change along a vertical direction and a horizontal direction for selected points on the components (e.g., left end, center, right end, etc.). In addition to position changes, the spatial change measurement function 304 can also determine the extent the shape of a component has changed, for example, due to the component bending or flexing under the tension load.

The temporal change measurement function 306, on the other hand, measures an elapsed time corresponding to any change in position of the pump assembly component. That is, the temporal change measurement function 306 measures the time it took for the component to move from one position to another. In some embodiments, the temporal change measurement function 306 may use the timestamps on the camera images to measure the elapsed time. Where multiple cameras 146 are used, the time clocks on the different cameras need to be synchronized with one another (e.g., via the pump control system 152, a centralized time system, etc.). The time measurements may be based on how long it took a pump assembly component to travel from one position to another position, or how long it took to reverse direction, for example. In the example where the target pump assembly component is the donkey head 126, the temporal change measurement function 306 may take the difference in image timestamps from when a selected point (e.g., the center) on the donkey head 126 is in a first predefined position A versus a second predefined position B, and vice versa. This timing may then be used to determine, for example, the speed with which the donkey head 126 travels in a given direction.

The parameter analysis function 308 computes one or more operational parameters (i.e., calculates the values therefor) from the measurements obtained by the spatial change measurement function 304 and the temporal change measurement function 306. In the above example, the parameter analysis function 308 may compute a pump speed from the spatial and temporal measurements of the donkey head 126. In addition, or alternatively, the parameter analysis function 308 may compute the pump speed by evaluating the crank arm 122. This may be done, for example, by measuring the time (e.g., in milliseconds) it takes the crank arm 122 to appear in an image in a predefined position, then appear again in the predefined position in a subsequent image. The pump speed may then be computed based on the speed (of rotation) of the crank arm 122. From the pump speed, the parameter analysis function 308 may determine whether the pump assembly is experiencing abnormal operating conditions, such as fluid pound, excessive load, and the like.

In addition to pump speed, the parameter analysis function 308 may also compute pump fillage level or fluid column height in the tubing 114 (which is analogous to pump fillage level). For example, the parameter analysis function 308 may compute the fluid column height from camera images showing the bridle 130 and/or polished rod 132 during a downstroke of the pump assembly. A sudden change in pump speed during the downstroke, based on images of the bridle 130 and/or polished rod 132, indicates the point where the pump barrel 136 struck the fluid column (in an unobstructed pump). From the position of the bridle 130 and/or polished rod 132, and using operator-provided dimensions for the tubing 114, the plunger 136, and the pump barrel 140, the height of the fluid column can be calculated. This operational parameter can then be used to compute an optimal pump speed. The fluid column height can also be used to obtain the pump fillage level, which can then be used to compute the optimal pump speed. A fluid pound condition may also be identified in the parameter analysis function 308 based on the computed pump fillage level. Known anomalies in the tubing 114, such as jogs or obstructions, may be accounted for by ignoring positions on the downstroke that coincide with any such known obstructions (as assigned by an operator).

As well, the parameter analysis function 308 can determine whether the pump assembly is balanced, in some embodiments, by comparing the rate of change in pump speed during the upstroke and the downstroke. The parameter analysis function 308 can also detect belt slippage, in some embodiments, by comparing measured (actual) pump speed against set or programmed pump speed. Walking beam deflection can be detected by evaluation the shape of the walking beam 124 (i.e., how straight is the walking beam) for a full pump cycle. A significant deflection (e.g., greater than 10 degrees) in the walking beam 124 could indicate the pump assembly is under excessive load. An alert may be issued as a response to detection of the deflection to indicate that the pump is under a significant and potentially excessive load.

The response may be issued by the responsive action function 310, which is generally responsible for initiating one or more corrective actions and/or adjustments when the pump assembly 116 is experiencing an abnormal operation. An abnormal operation occurs when the parameter analysis function 308 determines that one of the operational parameters discussed above (e.g., pump speed, fluid column height, pump balance, belt slip, walking beam deflection, etc.) falls outside preset operating ranges. When that happens, the responsive action function 310 may take corrective actions and/or adjustments that include, for example, logging the date and time of the abnormal operation, sending an alert message to a user and/or external system, adjusting a motor speed of the pump assembly to correct the abnormal operation, shutting off power to the pump assembly, and the like, depending on the particular operational parameter at issue.

Figure 4:
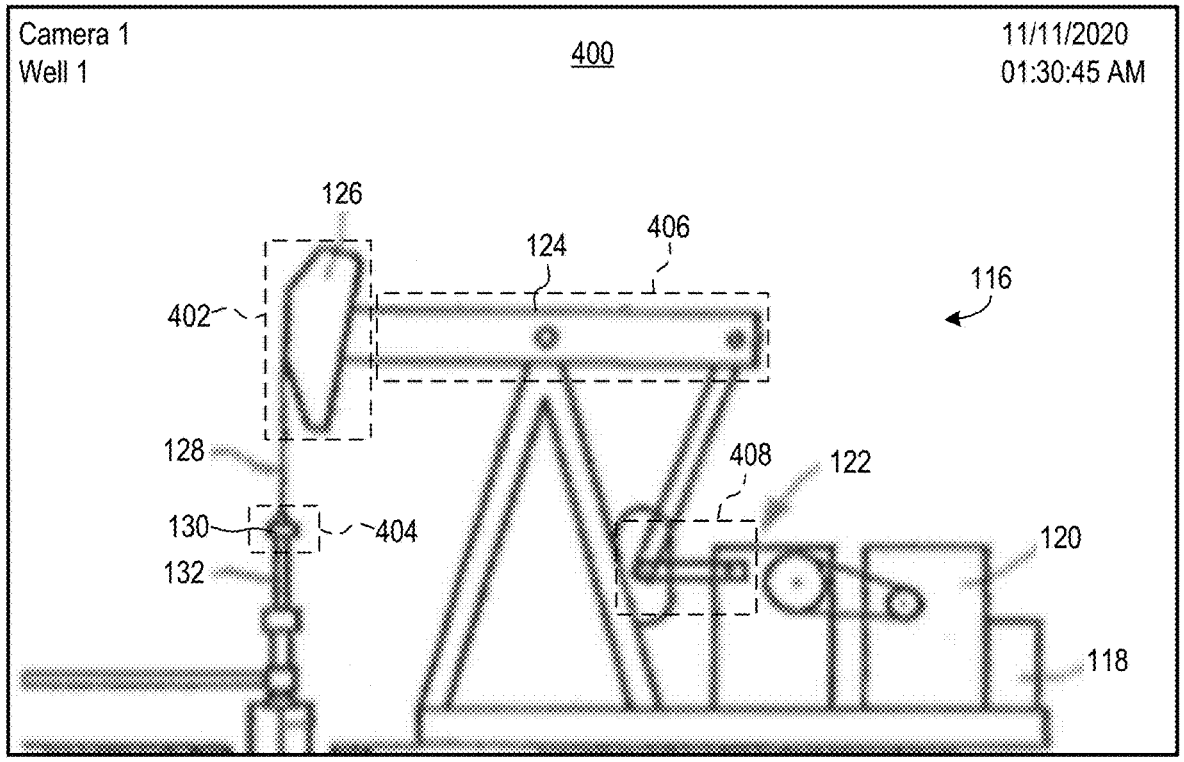
FIG. 4 is an example of a camera image that may be used to analyze a pump assembly according to embodiments of the present disclosure.

FIG. 4 is an example of a camera image 400 taken of the pump assembly 116 that may be analyzed by the pump image analysis module 220. As can be seen, the camera image 400 was taken with the camera viewing angle substantially perpendicular to at least one component the pump assembly 116. The particular camera (e.g., Camera 1) and the particular well (e.g., Well 1) are identified in the upper left corner of the image in this example, and the date and time stamp are shown in the upper right corner.

From the above image 400, the pump image analysis module 220 can focus on certain areas, shown in dashed lines, to recognize specific components of the pump assembly 116 and measure the movement of such components. For example, the pump image analysis module 220 can focus on an area 402 to recognize the donkey head 126 and determine pump balance by measuring how fast the donkey head travels up versus down. Similarly, the pump image analysis module 220 can focus on an area 404 to recognize the bridle 130 and monitor for any sudden changes in the speed thereof during a downstroke to determine fluid column height. The pump image analysis module can focus on an area 406 to recognize the walking beam 124 and measure any deflection in the walking beam during a pump stroke to detect excessive load. Focusing on an area 408 allows the pump image analysis module 220 to recognize the crank arm 122 and determine pump speed by measuring the time between rotations of the crank arm.

Figure 5A:
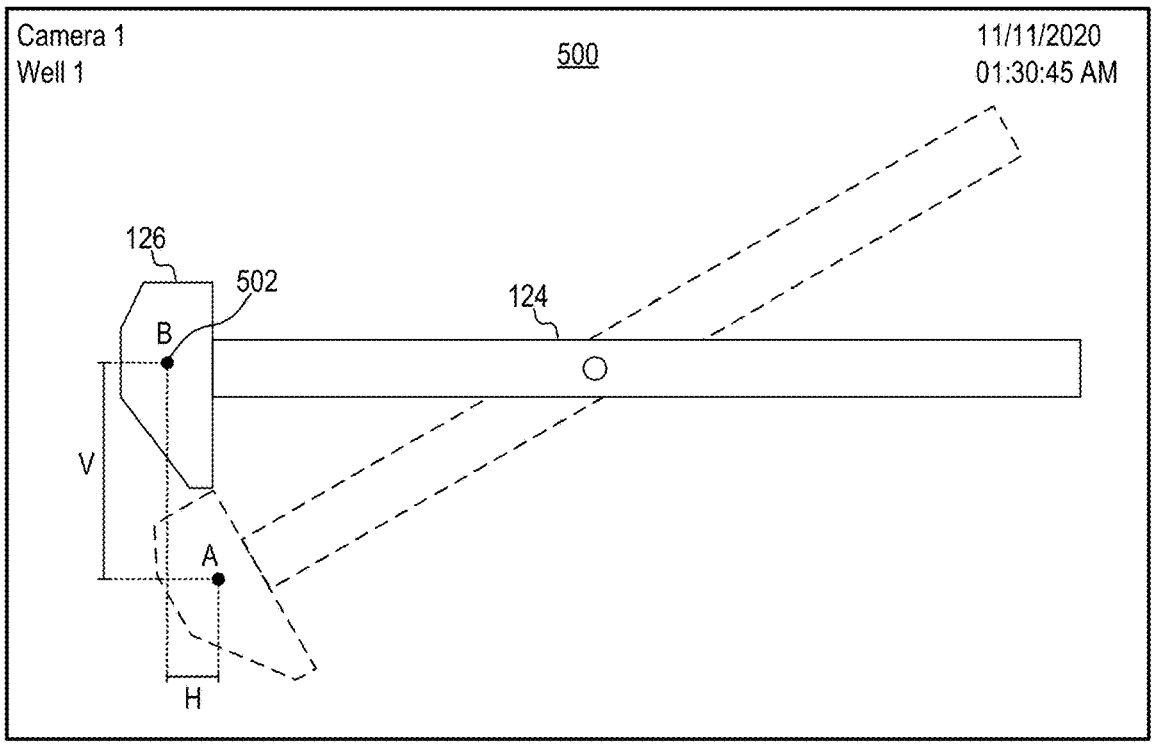
FIGS. 5A-5B are further examples of camera images that may be used to analyze a pump assembly according to embodiments of the disclosure.
Figure 5B:
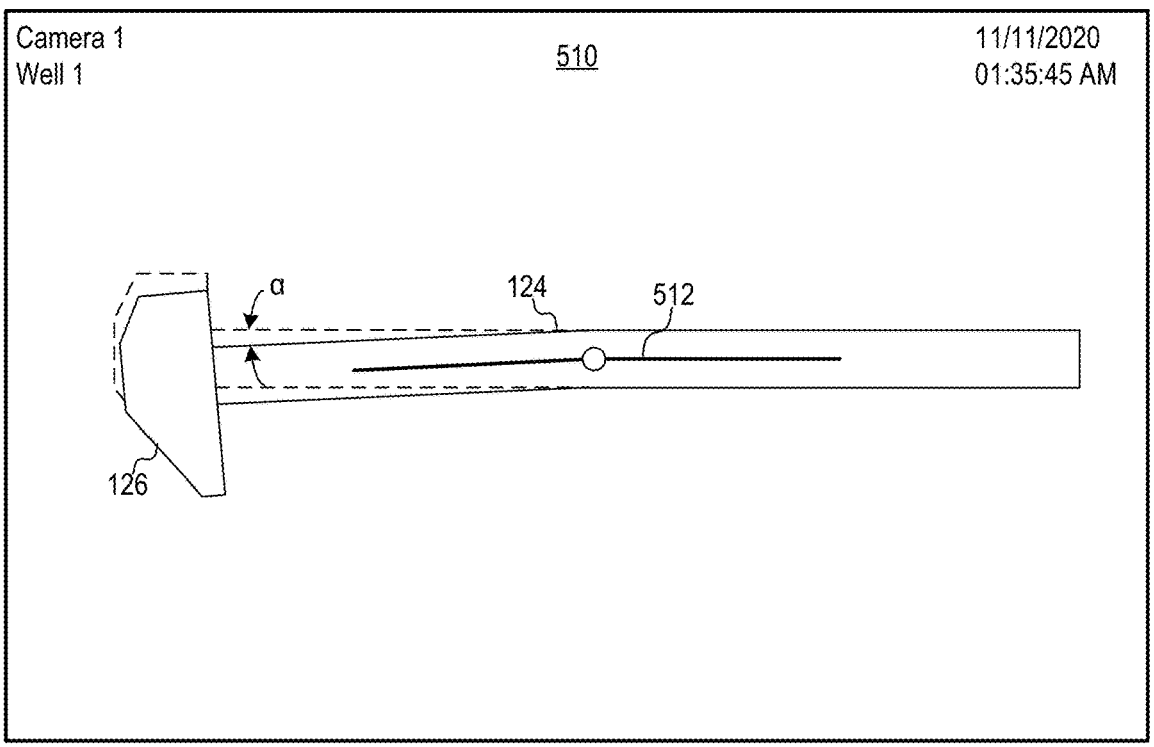

FIGS. 5A-5B are examples of camera images 500 and 510, respectively, taken of specific components of the pump assembly 116 in some embodiments. As with the image in FIG. 4, the camera images 500 and 510 here were taken with the camera viewing angle substantially perpendicular to at least one component of the pump assembly 116. Again, the particular camera and well are identified in the upper left corner and the date and time stamp are shown in the upper right corner. The specific pump assembly components captured in these images 500 and 510 are the walking beam 124 and donkey head 126, for illustrative purposes. Solid lines represent pump assembly components in the current camera image, and dashed lines represent the same pump assembly components from previous camera images.

In FIG. 5A, the pump image analysis module 220 has recognized the donkey head 126 and also recognizes that it has changed position since a previous image. Specifically, the pump image analysis module 220 recognizes that a point on the donkey head 126, in this case the center 502 of the donkey head, has moved from a first predefined position A to a second predefined position B. In some embodiments, the center 502 may be predefined by an operator for the pump image analysis module 220 (e.g., in the model of the component). Alternatively, a visually distinctive marker, such as a colored light, a reflective material, an object having particular shape or pattern, may be placed on the donkey head 126 to mark the center 502 in order to facilitate recognition by the pump image analysis module 220. In either case, the pump image analysis module 220 can measure the spatial change in the donkey head 126 by measuring a vertical distance V and a horizontal distance H traveled by the center 502. The pump image analysis module 220 can then measure the temporal change by comparing the timestamp of the current image to the timestamp of a previous image. From these measurements, the pump image analysis module 220 can determine the speed with which the donkey head 126 traveled from the first predefined position A to the second predefined position B.

Although FIG. 5A is described with respect to the walking beam 124 and donkey head 136, a similar arrangement may be employed for other components of the pump assembly 116, such as the crank arm 122, bridle 130, polished rod 132, and so forth.

In FIG. 5B, the pump image analysis module 220 has recognized the walking beam 124 and also recognizes that it has undergone some deflection since a previous image. Specifically, the pump image analysis module 220 recognizes that a centerline 512 on the walking beam 124 as experienced some flexing relative to a previous image. As with the example in FIG. 5A, the centerline 512 may be predefined by an operator for the pump image analysis module 220, or a visually distinctive strip or set of markers may be placed on the walking beam 124 to mark the centerline 512. In either case, the pump image analysis module 220 can measure the spatial change in the walking beam 124 by measuring an angle α of the deflection. From this measurement, the pump image analysis module 220 can determine the amount of tension load being experienced by the walking beam 124.

Thus far, specific embodiments of the present disclosure have been shown and described with reference to several figures. Following now is general method of using digital cameras and image analysis provide real-time optical monitoring and control of well operations according to embodiments of the present disclosure.

Figure 6:
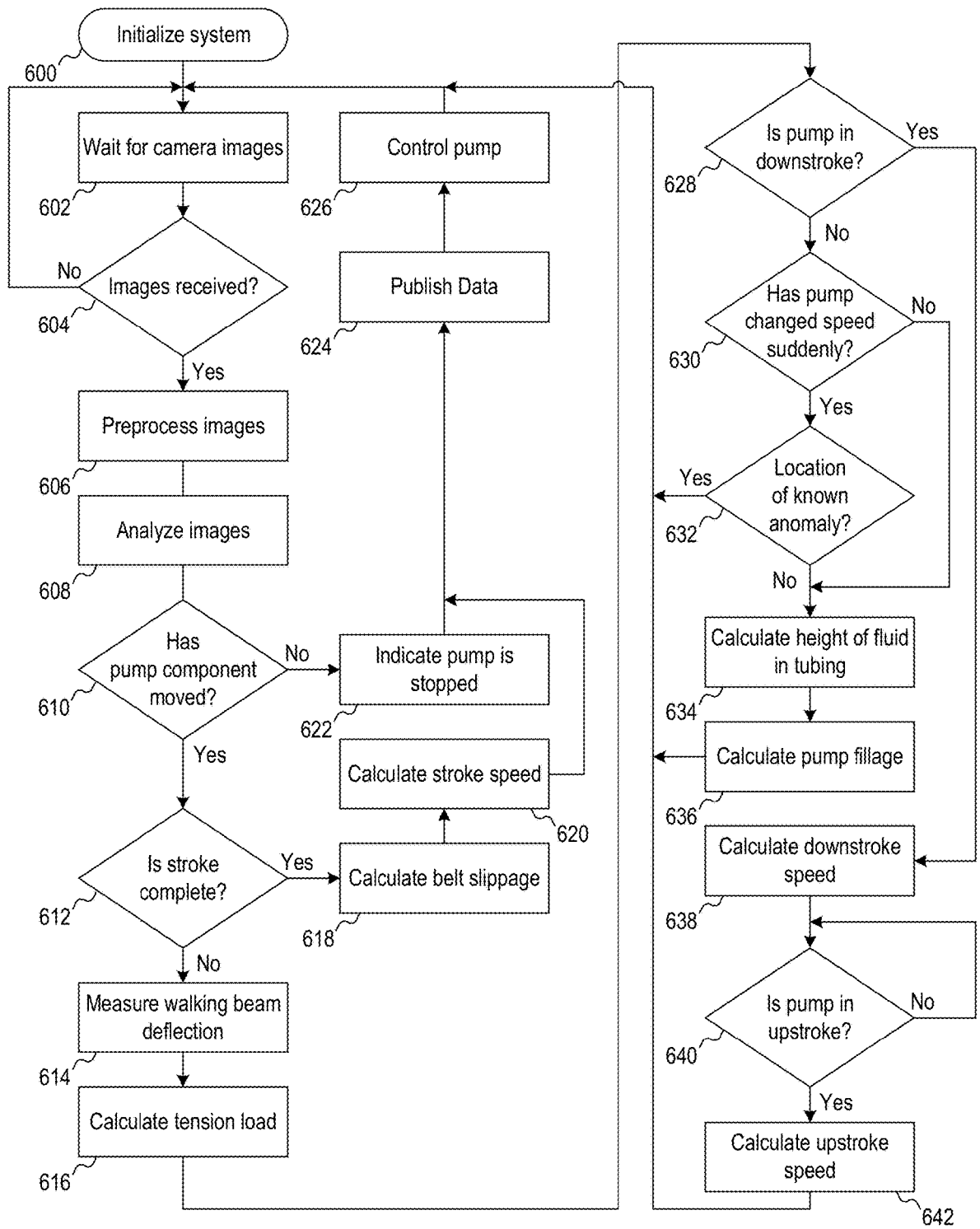
FIG. 6 is a flow diagram illustrating an exemplary method that may be used with an image-based pump control system according to embodiments of the disclosure.

Referring to FIG. 6, a flow diagram illustrating an exemplary method 600 is shown for providing real-time optical monitoring and control of well operations using digital cameras and image analysis. The method generally begins at 600 where a monitoring and control system is initialized and otherwise made ready to receive and analyze pump images taken by cameras at an oil and gas well. At 602, the system waits for camera images to be received. At 604, the system checks whether the camera images have been received. If no, then the system returns to 602 and continues to wait. If yes, then at 604, the system preprocesses the camera images, for example, to remove any extraneous objects, and confirms that the camera images are valid. At 608, the system analyzes the images in the manner described above (e.g., using one or more ML algorithms) to recognize one or more pump components in the images.

At 610, the system checks, based on the analysis at 608, whether one or more pump components in the images have moved or otherwise changed positions. If yes, then at 612, the system checks whether a pump stroke has been completed (based on the image analysis). If no, then at 614, the system checks the walking beam for any deflection that may be present. At 616, the system calculates the tension load based on any walking beam deflection that may have been found from 614.

Conversely, if the check at 610 is no, meaning the pump is stopped, then the system logs or otherwise indicates that the pump is stopped at 622.

If the check at 612 is yes, meaning a pump stroke has been completed, then the system calculates any belt slippage at 618 and also calculates the stroke speed at 620. From 620 and 622, system proceeds to 624 and publishes the data to an external system or network (see FIG. 1) for further monitoring and analysis. At 626, the system controls the pump as needed, for example, by starting the pump if the pump was stopped, or by increasing the pump speed if the stroke speed is too low, or by decreasing the pump speed if belt slippage was found.

From 616, the system proceeds to 628 and checks whether the pump is in a downstroke. If yes, then the system proceeds to 638 to calculate the downstroke speed. At 640, the system waits for the pump to begin an upstroke, then calculates the upstroke speed at 642. The system thereafter returns to 602 to await additional camera images.

Conversely, if the check at 628 is no, then the system checks whether the pump has experienced a sudden speed change. If yes, then the system checks whether the sudden speed change occurred at a location of a known anomaly, such as a known obstruction in the tubing. If no, then at 634, the system calculates the height of the fluid in the tubing based on the sudden speed change at 630. From there, the system proceeds to 636 to calculate the pump fillage level using the height of the fluid in the tubing, then returns to 602 to await additional camera images.

Similarly, if the check at 632 is yes, meaning the sudden speed change was due to a known anomaly, then the system returns to 602 to await additional camera images. On the other hand, if the check at 630 is no, meaning there was no sudden speed change, then the system jumps to 634 and proceeds in the manner described above.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

In addition, the various embodiments disclosed herein may be implemented as a system, method or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A system for monitoring and controlling a pump assembly at a well, comprising:
    a processor; and
    a storage device coupled to communicate with the processor, the storage device storing computer-readable instructions thereon that, when executed by the processor, cause the system to:

receive camera images of the pump assembly, the camera images captured by at least one digital camera at the well;

measure a change in a component of the pump assembly, the component appearing in the camera images;

compute at least one operational parameter for the pump assembly based on the change in the component of the pump assembly;

determine whether the at least one operational parameter indicates the pump assembly is operating abnormally; and automatically initiate a corrective action in response to a determination that the pump assembly is operating abnormally.

2. The system of claim 1, wherein the camera images have a viewing angle that is substantially perpendicular to the component of the pump assembly.

3. The system of claim 1, wherein the computer-readable instructions cause the system to measure a change in the component by measuring a change in a position of the component in the camera images.

4. The system of claim 3, wherein the computer-readable instructions cause the system to measure the change in the position of the component by measuring a distance between a first predefined position for the component and a second predefined position for the component in the camera images.

5. The system of claim 3, wherein the computer-readable instructions further cause the system to measure an elapsed time corresponding to the change in the position of the component in the camera images.

6. The system of claim 1, wherein the computer-readable instructions cause the system to measure a change in the component by measuring a change in a shape of the component in the camera images.

7. The system of claim 1, wherein the pump assembly is a pumpjack and the component is one of: a walking beam, a donkey head, the bridal, a polished rod, and a crank arm.

8. A method of monitoring and controlling a pump assembly at a well, comprising:

receiving camera images of the pump assembly, the camera images captured by at least one digital camera at the well;

measuring a change in a component of the pump assembly, the component appearing in the camera images;

computing at least one operational parameter for the pump assembly based on the change in the component of the pump assembly;

determining whether the at least one operational parameter indicates the pump assembly is operating abnormally; and automatically initiating a corrective action in response to a determination that the pump assembly is operating abnormally.

9. The method of claim 8, wherein the camera images have a viewing angle that is substantially perpendicular to the component of the pump assembly.

10. The method of claim 8, wherein measuring a change in the component is performed by measuring a change in a position of the component in the camera images.

11. The method of claim 10, wherein measuring the change in the position of the component is performed by measuring a distance between a first predefined position for the component and a second predefined position for the component in the camera images.

12. The method of claim 10, further comprising measuring an elapsed time corresponding to the change in the position of the component in the camera images.

13. The method of claim 8, wherein measuring a change in the component is performed by measuring a change in a shape of the component in the camera images.

14. The method of claim 8, wherein the pump assembly is a pumpjack and the component is one of: a walking beam, a donkey head, the bridal, a polished rod, and a crank arm.

15. A system for monitoring and controlling a pump assembly at a well, comprising:

a pump control system at the well, the pump control system operable to control operation of the pump assembly;

at least one digital camera at the well, the at least one digital camera configured to capture images of the pump assembly and transmit the images to the pump control system;

wherein the pump control system is further operable to:

receive the images of the pump assembly captured by the at least one digital camera at the well;

measure a change in a component of the pump assembly, the component appearing in the images;

compute at least one operational parameter for the pump assembly based on the change in the component of the pump assembly;

determine whether the at least one operational parameter indicates the pump assembly is operating abnormally; and automatically initiate a corrective action in response to a determination that the pump assembly is operating abnormally.

16. The system of claim 15, wherein the images have a viewing angle that is substantially perpendicular to the component of the pump assembly.

17. The system of claim 15, wherein the pump control system measures a change in the component by measuring a distance between a first predefined position for the component and a second predefined position for the component in the images.

18. The system of claim 17, wherein the pump control system is further operable to measure an elapsed time corresponding to the change in the position of the component in the images.

19. The system of claim 15, wherein the pump control system measures a change in the component by measuring a change in a shape of the component in the images.

20. The system of claim 15, wherein the pump assembly is a pumpjack and the component is one of: a walking beam, a donkey head, the bridal, a polished rod, and a crank arm.

* * * * *